(12) United States Patent
Heo (10) Patent No.: US 11,760,483 B2
(45) Date of Patent: Sep. 19, 2023

(54) DRONE-TYPE AIR MOBILITY VEHICLE AND METHOD FOR CONTROLLING SAME

(71) Applicants: Hyundai Motor Company, Seoul (KR); Kia Corporation, Seoul (KR)

(72) Inventor: Jin Hyuck Heo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 37 days.

(21) Appl. No.: 17/696,523

(22) Filed: Mar. 16, 2022

(65) Prior Publication Data

US 2022/0411054 A1 Dec. 29, 2022

(30) Foreign Application Priority Data

Jun. 25, 2021 (KR) .................. 10-2021-0083085

(51) Int. Cl.
*B64C 9/32* (2006.01)
*B64C 39/02* (2023.01)
*B64C 9/04* (2006.01)
*B64C 13/16* (2006.01)
*B64C 9/08* (2006.01)
*B64C 9/02* (2006.01)
*B64U 10/13* (2023.01)
*B64U 30/20* (2023.01)

(52) U.S. Cl.
CPC .............. *B64C 39/024* (2013.01); *B64C 9/02* (2013.01); *B64C 9/04* (2013.01); *B64C 9/08* (2013.01); *B64C 9/32* (2013.01); *B64C 13/16* (2013.01); *B64U 10/13* (2023.01); *B64U 30/20* (2023.01)

(58) Field of Classification Search
CPC .... B64C 9/02; B64C 9/04; B64C 9/08; B64C 9/32; B64U 10/13; B64U 30/20
See application file for complete search history.

(56) References Cited

U.S. PATENT DOCUMENTS

2011/0204181 A1* 8/2011 Hill .................. B64D 25/00 244/100 A
2017/0313433 A1* 11/2017 Ozaki .................. B64D 17/80
2021/0053672 A1 2/2021 Villabrille Prades
2021/0403153 A1* 12/2021 Anderson .............. B64D 25/00

FOREIGN PATENT DOCUMENTS

KR 2019-0063756 A 6/2019
KR 2019-0092752 A 8/2019

* cited by examiner

*Primary Examiner* — Tye William Abell
(74) *Attorney, Agent, or Firm* — Fox Rothschild LLP (57) ABSTRACT

A drone-type air mobility vehicle includes a body, a plurality of rotors, and a plurality of rotor arms configured to connect the plurality of rotors to the body. The drone-type air mobility vehicle further includes: a plurality of air flaps provided in the rotor arms, respectively, and configured to be deployed downwards with the respect to the respective rotor arms by gas injected into the air flaps; and a controller configured to determine whether the rotors are abnormal, based on a yaw rate of the mobility vehicle and state information of the rotors, and the controller configured to determine whether to deploy the air flaps according to a result of the determination on whether the rotors are abnormal.

15 Claims, 11 Drawing Sheets

DRONE-TYPE AIR MOBILITY VEHICLE AND METHOD FOR CONTROLLING SAME

CROSS REFERENCE TO RELATED APPLICATION

The present application claims under 35 U.S.C. § 119(a) the benefit of Korean Patent Application No. 10-2021-0083085 filed on Jun. 25, 2021, the entire contents of which are incorporated by reference herein.

BACKGROUND

1. Technical Field

The present disclosure relates to a drone-type air mobility vehicle and a method for controlling the same, more particularly, to the drone-type air mobility vehicle in which when a fuselage of the air mobility vehicle undergoes an excessive rotation due to rotor failure or the like, rotational velocity can be reduced, and impacts applied to the fuselage during an emergency landing can be minimized.

2. Description of the Related Art

Vertical take-off and landing (VTOL) aircrafts can take off and land in narrow spaces and have a high degree of flight freedom, and thus have recently been considered as future urban air mobility (UAM) vehicles. For example, there has been an increased interest in multirotor drone-type VTOL aircrafts (for example, quadcopters) in conjunction with development of electric powering technologies as a result of research and development of electric car technologies.

A multirotor drone can generate a forward movement, a backward movement, and a lateral movement by controlling a rotational velocity and direction of multiple rotors. If such a drone undergoes a problem with rotation of one rotor due to a failure, control error, or the like of the motor that drives the rotor, a fuselage inadvertently undergoes a strong rotation in a horizontal direction due to asymmetric rotational power supplied to the fuselage by the rotors. That is, a rotor failure may generate a strong yaw moment in the drone, and the drone fuselage rotates while generating an uncontrollable level of yaw rate.

Rotors that function normally typically generate a lift that prevents a drone from abruptly crashing. However, even if the rotors are controlled for an emergency landing, the drone is strongly rotated in one direction by the yaw moment and thus is subject to a strong impact during the landing in a direction opposite to a rotational direction.

Particularly, in the case of a drone-type air mobility vehicle with occupants, a rotation caused by a strong yaw moment may cause the operator to be unable to control the vehicle. Even if the vehicle can be controlled to attempt an emergency landing, impact energy generated during the landing may be transferred to and seriously injure the occupants.

The above descriptions regarding background technologies have been made only to help understanding of the background of the present disclosure, and are not to be deemed by those skilled in the art to correspond to already-known prior arts.

SUMMARY

Accordingly, it is an aspect of the present disclosure to provide a drone-type air mobility vehicle and a method for controlling the same, in which when a fuselage of the air mobility vehicle undergoes an excessive rotation due to a rotor failure or the like, a rotational velocity can be reduced, and impacts applied to the fuselage during an emergency landing can be minimized.

In accordance with an aspect, the present disclosure provides a drone-type air mobility vehicle including a body, a plurality of rotors, and a plurality of rotor arms configured to connect the plurality of rotors to the body, the drone-type air mobility vehicle including: a plurality of air flaps respectively provided in the rotor arms and configured to be deployed downwards with respect to the respective rotor arms by gas injected into the air flaps; and a controller configured to determine whether the rotors are abnormal, based on a yaw rate of the mobility vehicle and state information of the rotors, and the controller configured to determine whether to deploy the air flaps according to a result of the determination on whether the rotors are abnormal.

In an embodiment of the present disclosure, each of the air flaps may include an inflator configured to discharge gas under control of the controller, and a cushion configured to be deployed downwards with respect to the rotor arm by gas discharged from the inflator.

In an embodiment of the present disclosure, the air flap may include a flap frame installed inside the cushion and configured to slide downwards during deployment of the cushion to be fixed at a preconfigured position, and a position at which the flap frame slides to be fixed may be lower than a lower end of the rotor arm.

In an embodiment of the present disclosure, the air flap may further include a column part fixedly arranged on each of the opposite ends of the flap frame, and a guide structure which is fixed to an upper region inside the rotor arm and into which the column part is inserted in a body tube structure.

In an embodiment of the present disclosure, the cushion may include, when deployed, a first region extending downwards with respect to the rotor arm to form a vertical plane, and a second region extending from one end of the first region toward the body of the mobility vehicle to form a horizontal plane.

In an embodiment of the present disclosure, specific cushions among the cushions of the air flaps respectively installed in the plurality of rotor arms may be configured such that, when rotation of the mobility vehicle occurs after deployment, pressure caused by the rotation of the mobility vehicle is applied to a surface from which the second region does not extend, among both surfaces of the first region, and the second region is supported by the body.

In an embodiment of the present disclosure, specific cushions among the cushions of the air flaps respectively installed in the plurality of rotor arms may be configured such that, when rotation of the mobility vehicle occurs after deployment, pressure caused by the rotation of the mobility vehicle is applied to a surface which connects the first region and the second region, and the specific cushions are bent backwards in a rotation direction of the mobility vehicle.

In an embodiment of the present disclosure, the controller may be configured to determine whether to operate the air flaps, based on a steering command of the air mobility vehicle, the yaw rate of the mobility vehicle, and the state information of the rotor.

In an embodiment of the present disclosure, the controller may be configured to deploy the air flaps in cases in which the steering command of the air mobility vehicle is 0, a yaw rate of the mobility vehicle is greater than a preconfigured reference value, and a speed of at least specific rotors among the plurality of rotors is less than a preconfigured reference value or an abnormality occurrence signal of the plurality of rotors is received from another controller.

In an embodiment of the present disclosure, the controller may be configured to: after determining to deploy the air flaps, first deploy a cushion having the first region disposed ahead of the second region along the rotation direction of the air mobility vehicle during deployment; and when a rotational speed of the air mobility vehicle needs to be further decelerated, additionally deploy a cushion having the second region disposed ahead of the first region along the rotation direction during deployment.

In accordance with another aspect, the present disclosure provides a method for controlling the above-described drone-type air mobility vehicle, the method including: determining, by the controller, whether to deploy the air flaps; when the controller determines to deploy the air flaps, primarily deploying specific air flaps among the plurality of air flaps, based on the rotation direction of the air mobility vehicle; and when the controller determines that the rotational speed of the air mobility vehicle needs to be further decelerated, additionally deploying the remaining air flaps.

In an embodiment of the present disclosure, the air flap may include a cushion configured to be deployed by air injected into the cushion, and the cushion may include, when deployed, a first region extending downwards with respect to the rotor arm to form a vertical plane, and a second region extending from one end of the first region toward the body of the mobility vehicle to form a horizontal plane.

In an embodiment of the present disclosure, in the primarily deploying specific air flaps, the controller may deploy a cushion having the first region disposed ahead of the second region along the rotation direction during deployment.

In an embodiment of the present disclosure, in the additionally deploying the remaining air flaps, the controller deploys a cushion having the second region disposed ahead of the first region along the rotation direction during deployment.

In an embodiment of the present disclosure, in the determining whether to deploy the air flaps, the controller determines to deploy the air flaps in cases in which the steering command of the air mobility vehicle is 0, a yaw rate of the mobility vehicle is greater than a preconfigured reference value, and a speed of at least specific rotors among the plurality of rotors is less than a preconfigured reference value or an abnormality occurrence signal of the plurality of rotors is received from another controller.

According to the above-described drone-type air mobility vehicle and the method for controlling the same, when the fuselage undergoes an excessive rotation due to rotor failure or the like, a rotational velocity of the fuselage can be reduced by generating an air resistance with air flaps, and impacts applied to the fuselage during an emergency landing can thus be minimized.

Particularly, according to the above-described drone-type air mobility vehicle and the method for controlling the same, some of the air flaps are disposed on the lower portion of the mobility vehicle fuselage such that impacts resulting from a collision between the lower portion of the fuselage and the ground during a landing can be alleviated more effectively.

Advantageous effects obtainable from the present disclosure are not limited to the above-mentioned advantageous effects, and other advantageous effects not mentioned herein will be clearly understood by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a drone-type air mobility vehicle and a control method thereof according to various embodiments will be described in more detail with reference to the accompanying drawings.

Figure 1:
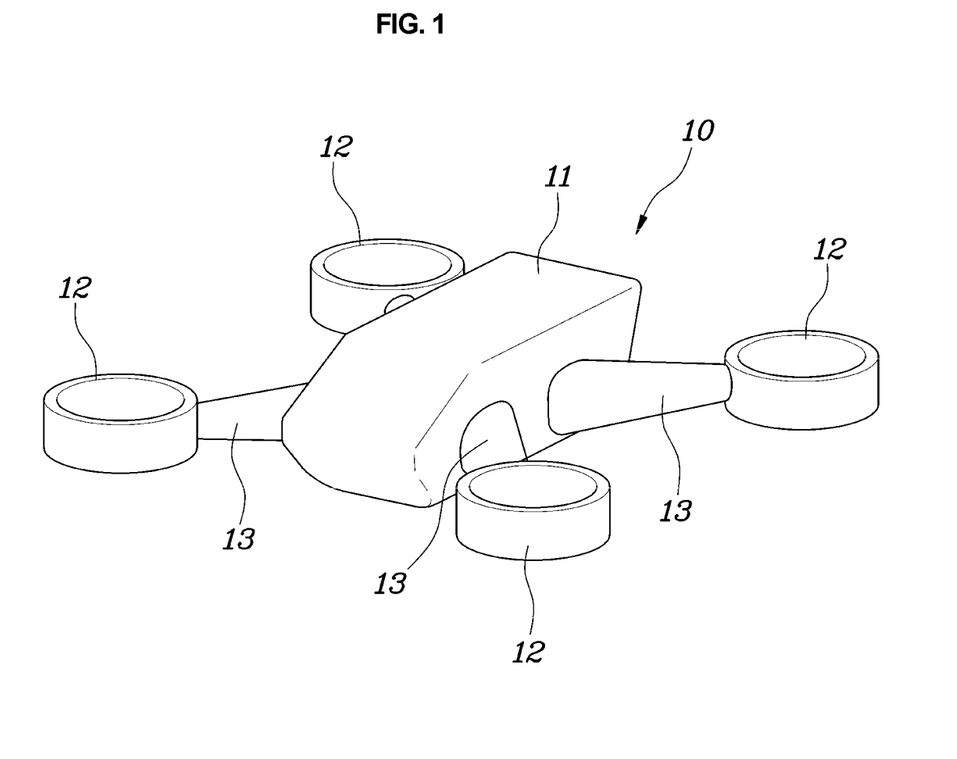
FIG. 1 is a perspective view illustrating an external appearance of a drone-type air mobility vehicle according to one embodiment of the present disclosure.
Figure 2:
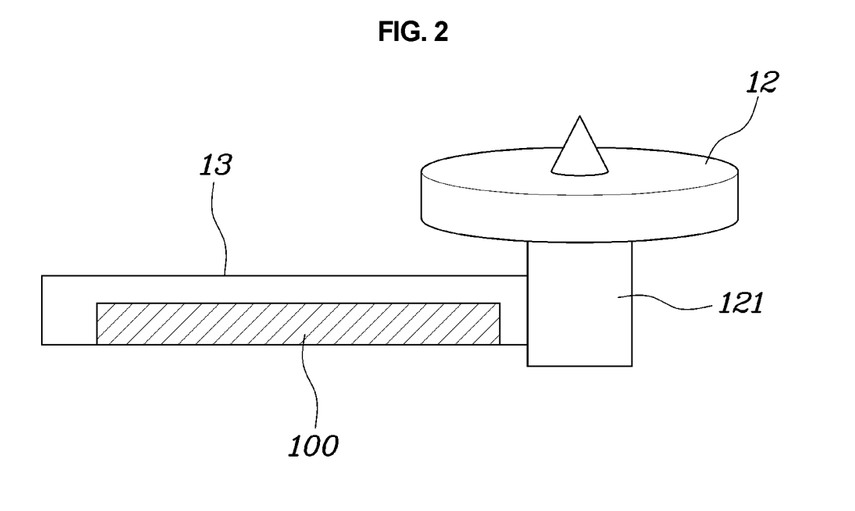
FIG. 2 explains a position where an air flap is installed in a drone-type air mobility vehicle according to one embodiment of the present disclosure, and FIG. 3 explains a position where an air flap is installed in a drone-type air mobility vehicle according to one embodiment of the present disclosure.
Figure 3:
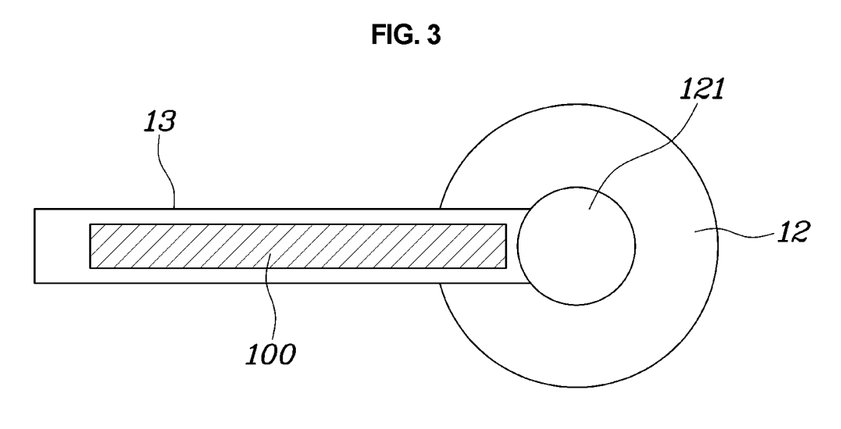

FIG. 1 is a perspective view illustrating an external appearance of a drone-type air mobility vehicle according to one embodiment of the present disclosure, FIG. 2 explains a position where an air flap is installed in a drone-type air mobility vehicle according to one embodiment of the present disclosure, and FIG. 3 explains a position where an air flap is installed in a drone-type air mobility vehicle according to one embodiment of the present disclosure.

Referring to FIGS. 1 to 3, a drone-type air mobility vehicle 10 according to one embodiment of the present disclosure may include a body 11, a plurality of rotors 12, and a plurality of rotor arms 13. In addition, the drone-type air mobility vehicle 10 preferably includes a plurality of air flaps 100 provided in the rotor arms 13, respectively, and configured to be deployed downwards by gas injected into the air flaps 100, and a controller configured to determine whether to deploy the air flaps 100.

The body 11 may have a space in which a passenger of the drone-type air mobility vehicle 10 can board.

The rotors 12 are configured to generate lift of the mobility vehicle 10 by rotation, and may be connected to the body by the rotor arms 13. Each of the plurality of rotors 12 may be installed at an end of the rotor arm 13, and a motor 121 configured to provide rotational force to the rotor 12 may also be installed at the end of the rotor arm 13.

As described above, rotors installed on a drone may be configured to have different rotation directions, and a rotational speed for each rotation direction may be appropriately adjusted, so that movement, rotation, and ascending or descending in a certain direction can be determined. If an abnormality occurs in the rotation of specific rotors due to motor failure, control errors, or the like, a strong yaw moment is generated in the drone due to asymmetry of the rotational force provided to the drone by the rotor, and the drone undesirably makes a strong rotation in the yaw direction.

In this case, the drone does not fall sharply due to the lift generated by the rotor without any abnormality, but since the drone is engaged in a strong rotation in one direction due to the yaw moment, a strong impact is generated in the opposite direction of rotation when landing on the ground, even by an emergency landing by controlling the rest of the normal rotors.

Especially, in the case of a drone-type air mobility vehicle with an occupant, rotation caused by a strong yaw moment may not allow the on-board driver to control the mobility vehicle, and even if an emergency landing is attempted in a controllable state, the impact energy generated during ground landing may be transmitted to the occupant and may cause serious injury to the occupant.

In various embodiments of the present disclosure, when rotation in the yaw direction occurs in the drone-type air mobility vehicle due to an abnormality of specific rotors, the rotors can be controlled such that rotation of the mobility vehicle can be suppressed and an emergency landing is made as safe as possible.

The drone-type air mobility vehicle 10 according to various embodiments of the present disclosure includes an air flap 100 configured to be deployed downwards with respect to the mobility vehicle 10 by gas injected into the rotor arm 13 between the body 11 and the rotor 12 of the mobility vehicle 10, to reduce the rotation of the mobility vehicle 10 due to the abnormalities occurring in specific rotors and relieve the impact when landing.

In a state where the operation of the mobility vehicle 10 is normally performed, the air flap 100 may be accommodated in a folded state inside the rotor arm 13, and when rotation of a certain level or more occurs in the mobility vehicle 10, the air flap 100 may be deployed downwards with respect to the rotor arm 13 by gas injected into the air flap 100 to reduce the rotation of the mobility vehicle 10 through air resistance and relieve the impact during landing through the gas injected therein.

Figure 4:
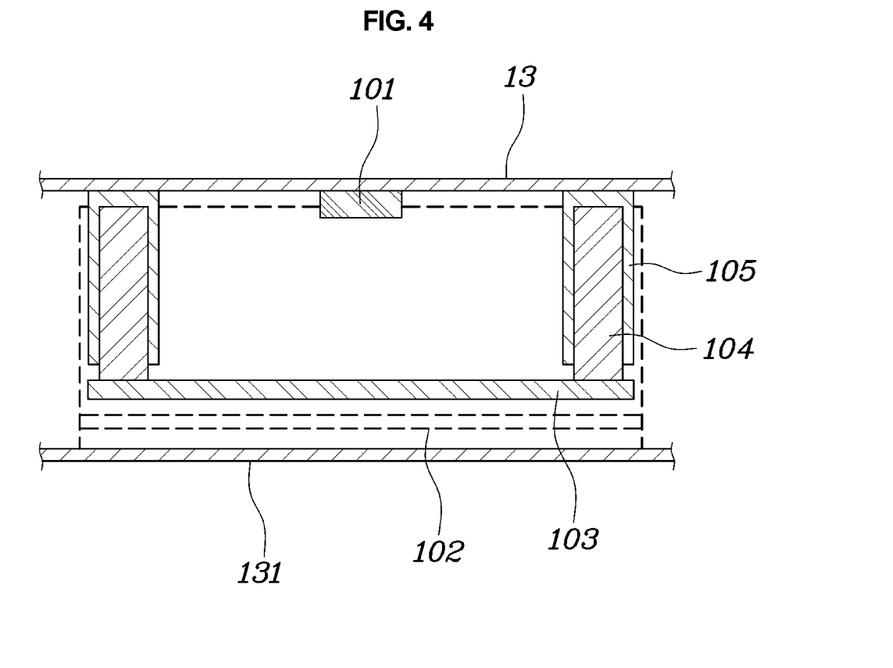
FIG. 4 schematically illustrates a structure before deployment of an air flap installed in a drone-type air mobility vehicle according to one embodiment of the present disclosure, and FIG. 5 schematically illustrates a structure after deployment of an air flap installed in a drone-type air mobility vehicle according to one embodiment of the present disclosure.
Figure 5:
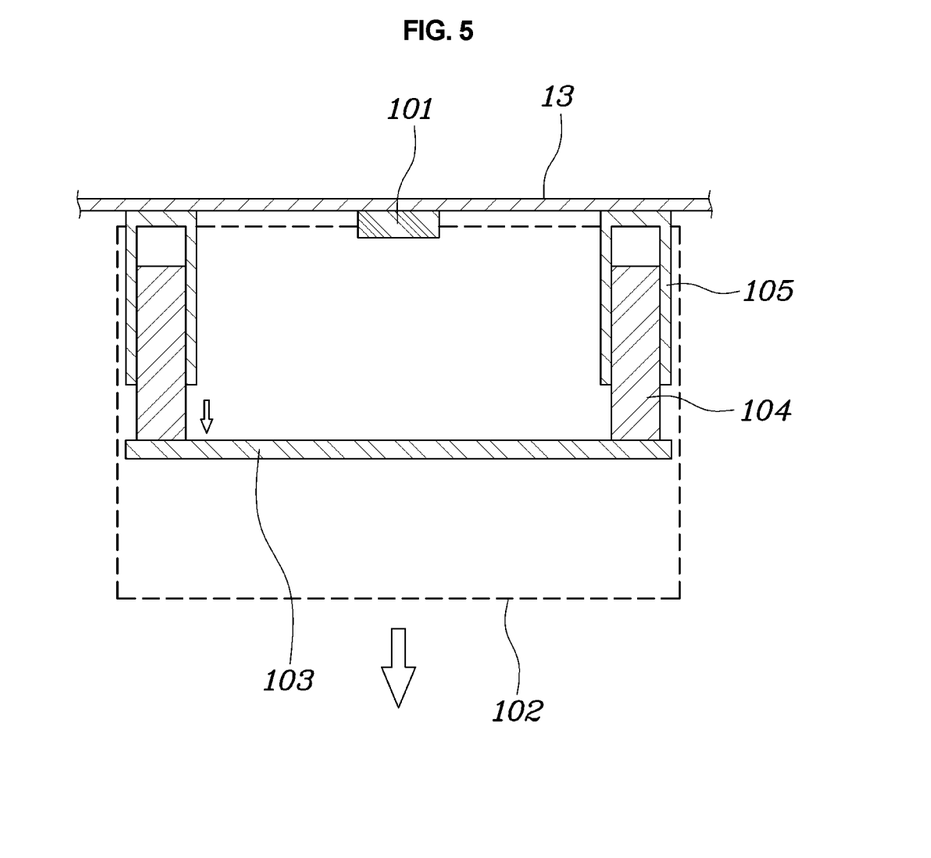

FIG. 4 schematically illustrates a structure before deployment of an air flap installed in a drone-type air mobility vehicle according to one embodiment of the present disclosure, and FIG. 5 schematically illustrates a structure after deployment of an air flap installed in a drone-type air mobility vehicle according to one embodiment of the present disclosure. In addition, FIG. 6 schematically illustrates a state in which an air flap installed in a drone-type air mobility vehicle according to one embodiment of the present disclosure is deployed.

Figure 6:
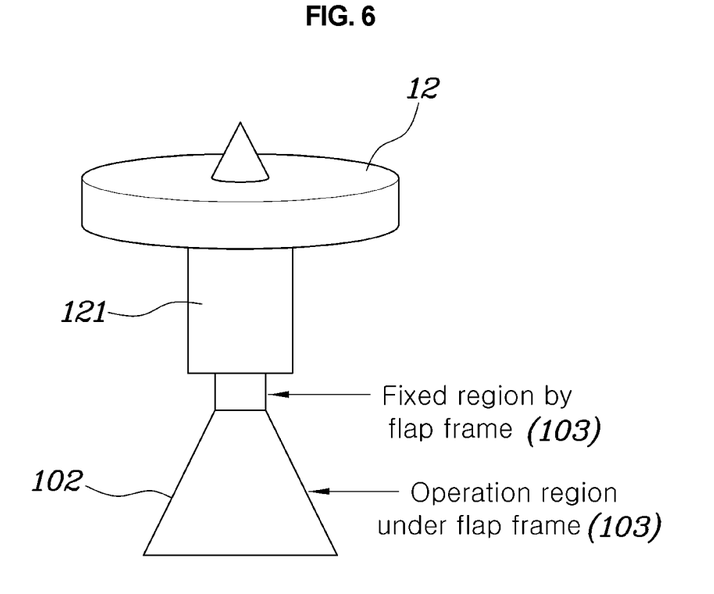
FIG. 6 schematically illustrates a state in which an air flap installed in a drone-type air mobility vehicle according to one embodiment of the present disclosure is deployed.

As shown in FIGS. 4 to 6, the air flap may include: an inflator 101 installed in the rotor arm 13 and configured to discharge gas under control of the controller when the air flap deployment condition is satisfied; and a sail-bag type cushion 102 configured to be deployed by the gas discharged from the inflator 101 to be exposed to the outside of the rotor arm 13.

The cushion 102 of the air flap may be accommodated in a folded form inside the rotor arm 13 before deployment.

The inflator 101 may be attached to an upper structure inside the rotor arm 13, and the inflator 101 may be installed such that the gas discharged through the gas outlet of the inflator 101 can be injected into the cushion 102. One end of the cushion 102 on which the inflator 101 is installed may be fixed inside the rotor arm 13.

The air flap 100 may further include a flap frame 103 installed inside the cushion 102 and configured to slide in the direction (downwards) in which the cushion is deployed during the deployment of the cushion 102, to be fixed at a preconfigured position. During the deployment of the cushion 102, a position at which the flap frame 103 is fixed may be lower than the lower end of the rotor arm 13.

In addition, the air flap 100 may further include: a column part 104 fixedly arranged on each of the opposite ends of the flap frame 103; and a guide structure 105 which is fixed to an upper region inside the rotor arm 13 and into which the column part 104 is inserted in a body tube structure. The column part 104 may slide up and down inside the guide structure 105. In particular, the column part 104 may slide downwards up to a preconfigured position especially after deployment of the cushion 102. A locking structure (not shown) enabling the column part 100 to slide only to a preconfigured position during the deployment of the cushion 102 may be disposed between the column part 104 and the guide structure 105.

After the cushion 102 is deployed by the flap frame 103, the movement of the cushion 102 may be restricted to a particular position under the rotor arm 13, and a region of the cushion 102 corresponding to the lower portion of the flap frame 103 may be moved by the movement of the air mobility vehicle 10 or by external wind.

An appropriate structural treatment may be made in advance such that, when the cushion 102 is deployed, the lower portion of the rotor arm 13 where the air flap is installed is opened to expose the deployed cushion 102.

Figure 7:
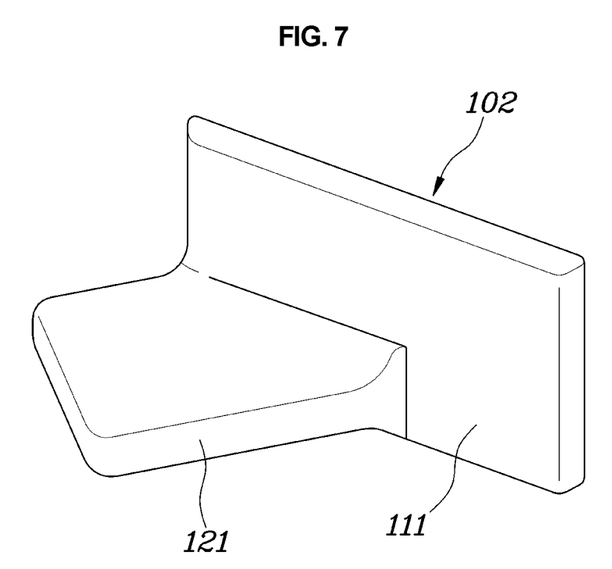
FIG. 7 is a perspective view illustrating a cushion of an air flap provided in a drone-type air mobility vehicle according to one embodiment of the present disclosure.
Figure 8:
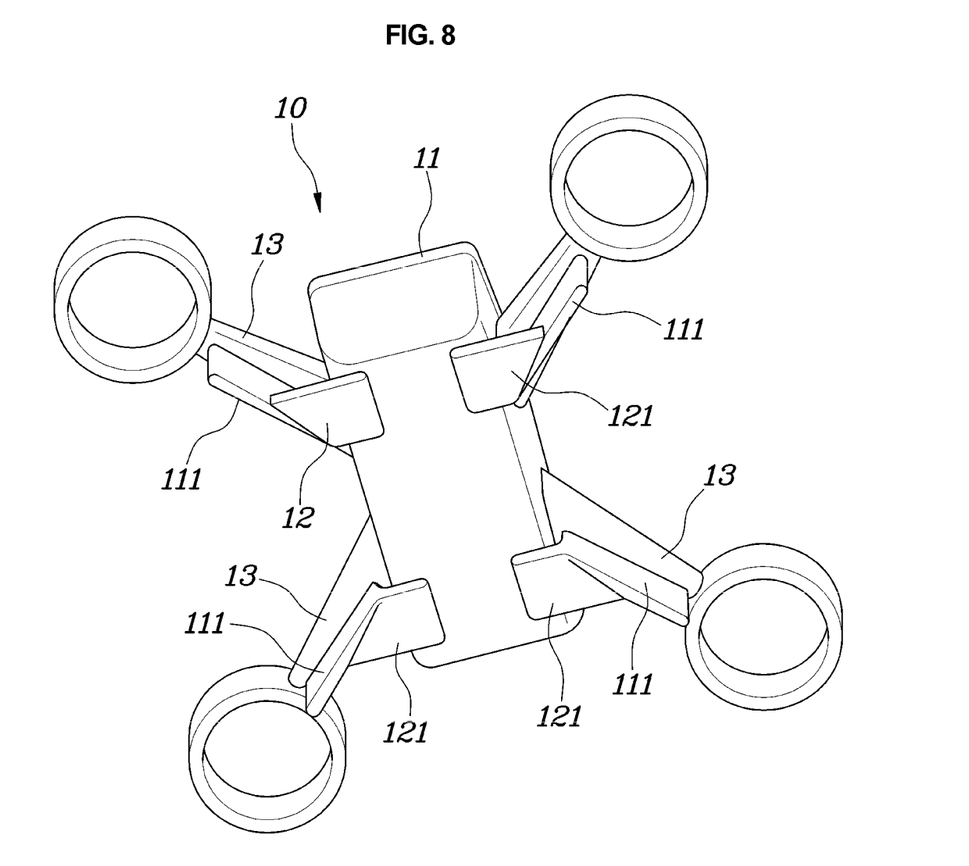
FIG. 8 is a perspective view of a drone-type air mobility vehicle in a state in which the cushion of the air flap as shown in FIG. 7 is deployed, as viewed from the bottom.

FIG. 7 is a perspective view illustrating a cushion of an air flap provided in a drone-type air mobility vehicle according to one embodiment of the present disclosure, and FIG. 8 is a perspective view of a drone-type air mobility vehicle in a state in which the cushion of the air flap as shown in FIG. 7 is deployed, as viewed from the bottom.

As illustrated in FIGS. 7 and 8, the cushion of the air flap provided in the drone-type air mobility vehicle 10 according to one embodiment of the present disclosure may have an L-letter structure including a first region 111 extending downwards with respect to the rotor arm 13 to form a vertical plane and a second region 121 extending from one end of the first region 111 toward the body 11 of the mobility vehicle 10 to form a horizontal plane.

The first region 111 of the cushion 102, which is a region arranged in the vertical direction of the mobility vehicle 10, may be a region to which a pressure due to air resistance is applied, when rotation in the yaw direction occurs in the mobility vehicle 10.

The second region 121 of the cushion 102, which is a region arranged in the horizontal direction of the mobility vehicle 10, may be a region that cushions the impact between the ground and the mobility vehicle 10 when the mobility vehicle 10 lands. Preferably, the second region 121 of the cushion 102 may be disposed adjacent to the lower portion of the body 11 to relieve the impact on the body 11 of mobility vehicle.

Figure 9:
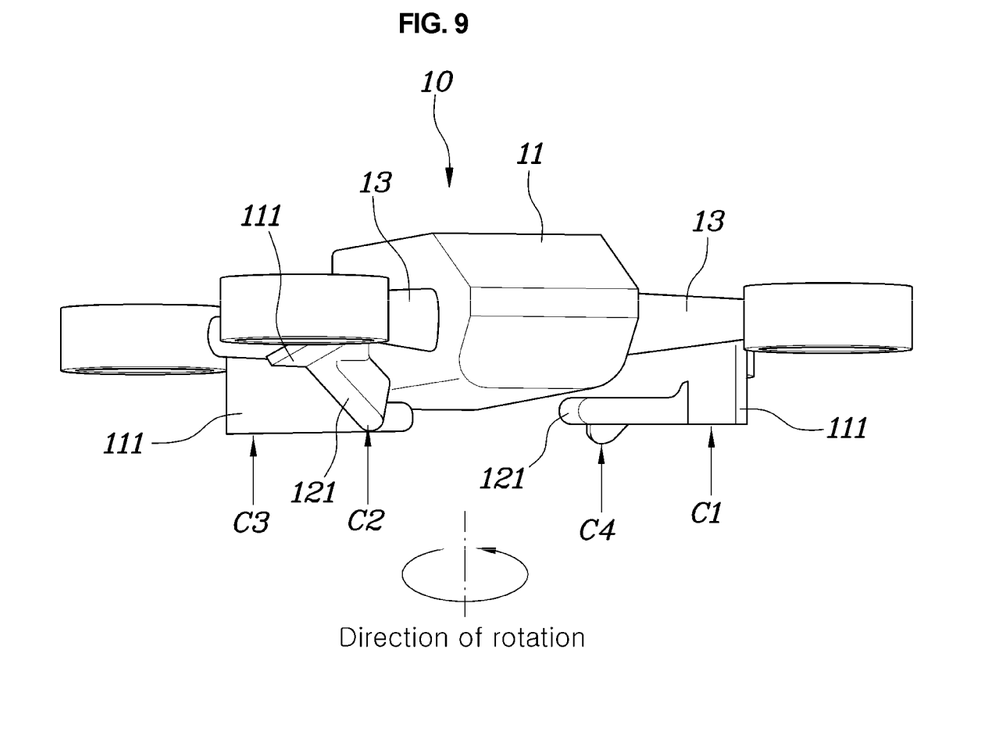
FIG. 9 illustrates a deformed shape of the cushion of the air flap when a yaw rotation of the mobility occurs in the deployed state of the cushion of the air flap as shown in FIG. 8.

FIG. 9 illustrates a deformed shape of the cushion of the air flap when a yaw rotation of the mobility vehicle occurs in a state where the cushion of the air flap is deployed, as shown in FIG. 8.

As shown in FIG. 9, when the mobility vehicle rotates in the yaw direction (in FIG. 9, the mobility vehicle rotates counterclockwise when viewed from the top of the mobility vehicle) because an abnormality occurs in specific rotors of the mobility vehicle and thus the rotors cannot work normally, the controller provided in the mobility vehicle may determine whether to operate the air flaps, and when the preconfigured operating condition is satisfied, may operate the air flaps such that the cushion can be deployed downwards with respect to the rotor arm 13.

Cushions C1 and C3 having the first region 111 disposed ahead of the second region 121 along the rotation direction are configured such that the pressure caused by the rotation of the mobility vehicle is applied to a surface from which the second region 121 does not extend, among both surfaces of the first region 111. In this case, since the second region 121 is disposed under the body 11 to be adjacent and parallel to the body 11, the second region 121 is supported by the body 11, and pressure may be continuously applied to almost the entire surface of the first region 111, without deformation of the corresponding cushions C1 and C3 due to the air pressure. Due to the resistance by the air pressure, the rotation of the mobility vehicle in the yaw direction may be decelerated.

Cushions C2 and C4 having the second region 121 disposed ahead of the first region 111 along the rotation direction are configured such that the pressure caused by the rotation of the mobility vehicle is applied to a surface which connects the first region 111 and the second region 121, among both surfaces of the first region 111. In this case, since the second region 121 is pushed backwards in the rotation direction and thus cannot be supported by the body 11, the corresponding cushions C2 and C4 are bent backward in the rotation direction. In this case, the air pressure due to the rotation of the mobility vehicle is applied to a space between the first region 111 and the second region 121 which are connected in an L-letter shape, and accordingly, an air pocket may be formed in the space between the first region 111 and the second region 121. This air pocket may further decelerate the yaw rotation of the mobility vehicle.

In one embodiment of the present disclosure, the controller may perform control such that, when the operation of the air flaps is required, the cushions C1 and C3 having the first region 111 disposed ahead of the second region 121 along the rotation direction are first deployed, and when the controller determines that additional deceleration is more necessary, the cushions C2 and C4 having the second region 121 disposed ahead of the first region 111 along the rotation direction are additionally deployed.

Figure 10:
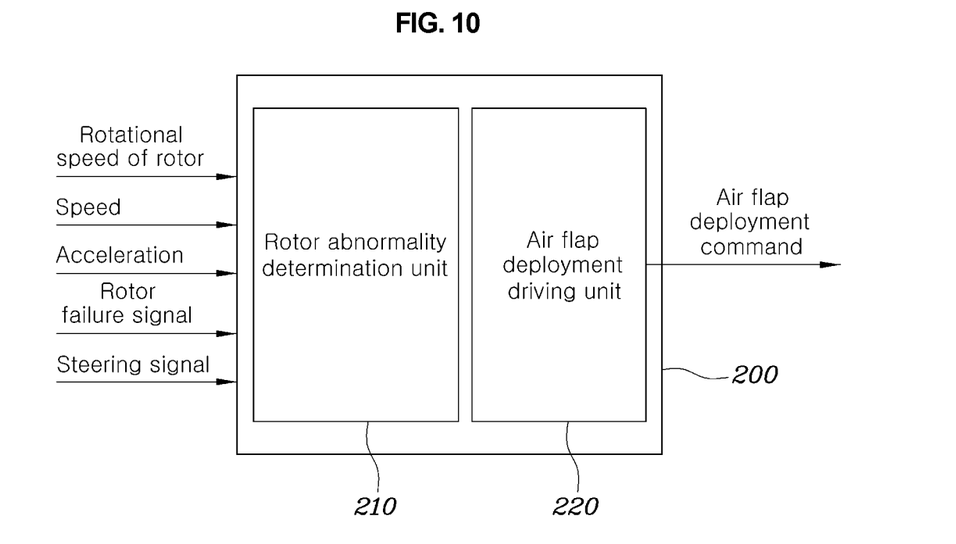
FIG. 10 is a block diagram schematically illustrating a controller of a drone-type air mobility vehicle according to one embodiment of the present disclosure.

FIG. 10 is a block diagram schematically illustrating a controller of a drone-type air mobility vehicle according to one embodiment of the present disclosure.

Referring to FIG. 10, the controller 200 may receive information related to movement of the mobility vehicle 10 or operating states of elements involved in the movement of the mobility vehicle 10 from various sensors installed in the mobility vehicle 10, and accordingly may determine the abnormality of the rotor 12 to determine whether to deploy the air flaps.

For example, the controller 200 may include: a rotor abnormality determination unit 210 configured to receive an input of a speed, acceleration, rotor rotational speed, a rotor failure signal, a steering signal, and the like, which are a related to each direction of the mobility vehicle 10, and determine whether the rotor is abnormal, based on information included in a received signal; and an air flap deployment driving unit 220 configured to drive the air flap 100 to deploy the cushion 102 of the air flap 100 when the rotor abnormality determination unit 210 determines that an abnormality has occurred in the rotor.

The speed and acceleration which are related to each direction of the mobility vehicle may be detected through a known acceleration sensor such as an inertial sensor or a gyro sensor. The rotational speed of the rotor may be detected by a Hall sensor or a resolver installed in a motor that provides rotational force to the rotor. The rotor failure signal may be generated when an abnormality occurs in the motor rotation by a preconfigured failure determination control logic applied by a motor controller that controls the motor that provides rotational force to the rotor. A steering signal, which is a signal generated by a driver's input for controlling the direction of movement of the mobility vehicle, is a signal corresponding to a steering command generated by a steering control means when the driver operates a steering control means such as a steering wheel to steer the mobility vehicle in the yaw direction. The steering command may be expressed as a size of a steering angle.

The technical meaning of a signal including information on speed and acceleration which are related to each direction of the mobility vehicle, a signal including the rotational speed of the rotor, a rotor failure signal, a steering signal, and the like can be easily understood and implemented by those skilled in the art.

In one embodiment of the present disclosure, the rotor abnormality determination unit 210 of the controller 200 may determine whether an abnormality has occurred in the rotor, based on a speed and acceleration signal of the mobility vehicle, a rotor rotational speed signal, a rotor failure signal, a steering signal, and the like, and the air flap deployment driving unit 220 may control to operate the air flaps so as to deploy the cushions when the rotor abnormality determination unit 210 determines that an abnormality has occurred in the rotor.

The operation of the mobility vehicle performed by control of the controller 200 will be more clearly understood through the description of a method for controlling the drone-type air mobility vehicle according to one embodiment of the present disclosure below.

Figure 11:
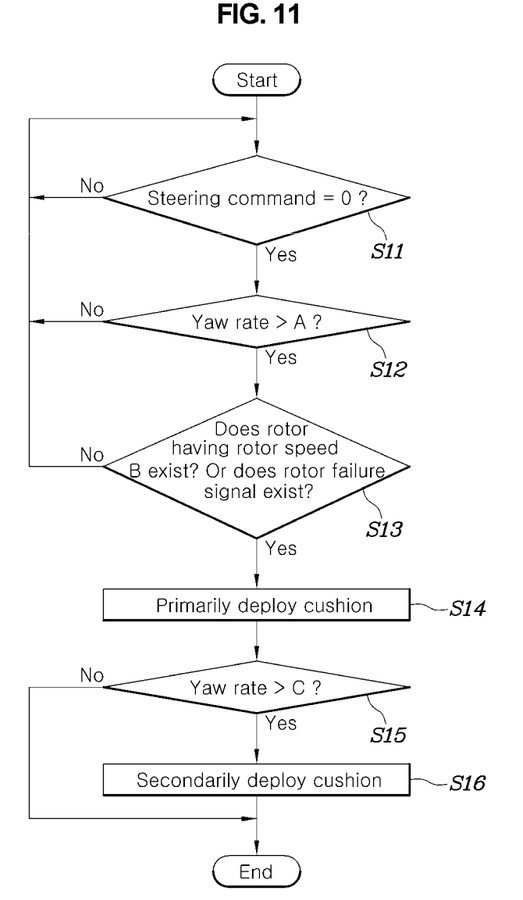
FIG. 11 is a flowchart showing a method for controlling a drone-type air mobility vehicle according to one embodiment of the present disclosure.

FIG. 11 is a flowchart showing a method for controlling a drone-type air mobility vehicle according to one embodiment of the present disclosure.

Referring to FIG. 11, the method for controlling a drone-type air mobility vehicle according to one embodiment of the present disclosure may start from operation S11 in which the controller 200 receives signals including information related to a major element and movement of the mobility vehicle from various sensors and other controllers, installed in the mobility vehicle, and determines whether the steering command included in the steering signal among the signals is 0.

Determining whether the steering command is 0 in operation S11 is to determine a state in which the steering control means is not operated by a driver of the air mobility vehicle. In a case where the yaw rotation of the mobility vehicle occurs at a certain level or more when a driver's input by using the steering control means does not exist, a determination on whether the steering command is 0 may be primarily made in operation S11 since the probability of the rotor abnormality is very high.

Next, the controller 200 may determine in operation S12 whether the yaw rate of the mobility vehicle is greater than a preconfigured reference value (A).

The reference value (A) applied in operation S12 corresponds to an appropriate yaw rate allowable for a mobility vehicle in a normal state when the steering command is 0, and thus is a value that may be configured in advance by an experimental method.

When the steering command is determined as being 0 in operation S11 and the yaw rate of the mobility vehicle is determined as being greater than the preconfigured reference value (A) in operation S12, the controller 200 may determine the rotor abnormality in operation S13.

In operation S13, the controller 200 may compare the rotational speed of each rotor with a preconfigured reference value (B) and may determine that an abnormality has occurred in the rotor having a rotational speed smaller than the reference value (B), and accordingly may cause the air flaps to be operated. The reference value (B) may correspond to the minimum rotational speed required for the rotor in all cases in which the rotation of the rotor is controlled for movement of the air mobility vehicle, and thus may be determined in advance by an experimental method.

As another example, in operation S13, the controller 200 may determine that an abnormality has occurred in the corresponding rotor when the rotor abnormality occurrence information is included in the rotor abnormality signal provided from the motor controller and the like for controlling the motor providing rotational force to the rotor, and accordingly may cause the air flaps to be operated.

Next, when a determination is made in S13 such that the air flaps is to be operated, specific air flaps of the plurality of air flaps may be primarily operated in operation S14.

The separate primary and secondary operations of the air flaps are due to the shape of the cushions included in the air flaps and the arrangement structure of the cushions after the cushion deployment, as described above.

By the controller 200 in operation S14, the cushions (C1 and C3 in the examples of FIGS. 8 and 9) installed in rotor arms 13 may be first deployed so that the first region 111 is ahead of the second region 121 of the cushion 102 along the rotation direction when the cushion 102 is deployed.

The cushions C1 and C3 developed in operation S14 are cushions which are configured such that the pressure caused by the mobility vehicle rotation is applied to a surface from which the second region 121 does not extend, among both surfaces of the first region 111. In addition, since the respective second regions 121 of the cushions C1 and C3 are disposed under the body 11 to be adjacent and parallel to the body 11, and thus the respective second regions 121 may be supported by the body 11. Accordingly, the cushions C1 and C3 developed in operation S14 may have the respective first regions 111 maintained in the vertical direction with respect to the mobility vehicle without deformation due to the air pressure so that pressure may be continuously applied to almost the entire surface of the first regions 111. Due to the resistance by the air pressure, the mobility vehicle rotation in the yaw direction may be decelerated.

Next, the controller 200 may compare the yaw rate of the mobility vehicle with a preconfigured reference value (C) in operation S15, and if the yaw rate of the mobility vehicle is greater than the reference value (C), may determine in operation S16 that the rotational speed deceleration in the yaw direction does not reach a desired level, to cause the remaining cushions C2 and C4 to be deployed.

The cushions C2 and C4 deployed in operation S16 are cushions which are arranged such that the second region 121 is disposed ahead of the first region 111 along the rotation direction upon the deployment.

When the cushions C2 and C4 are deployed, the cushions C2 and C4 are configured such that the pressure caused by the mobility vehicle rotation is applied to a surface which connects the first region 111 and the second region 121, among both surfaces of the first region 111. In this case, since the second region 121 is pushed backwards in the rotation direction and thus cannot be supported by the body 11, the corresponding cushions C2 and C4 are bent backward in the rotation direction. In this case, the air pressure due to the mobility vehicle rotation is applied to a space between the first region 111 and the second region 121 which are connected in an L-letter shape, and accordingly, an air pocket may be formed in the space between the first region 111 and the second region 121. This air pocket may further decelerate the yaw rotation of the mobility vehicle.

As described above, the drone-type air mobility vehicle and the control method thereof according to various embodiments of the present disclosure can reduce the impact applied to the mobility vehicle during an emergency landing of the mobility vehicle by generating air resistance by the air flap when excessive rotation of the mobility vehicle occurs due to rotor failure and the like to decelerate the rotational speed of the mobility vehicle.

In particular, the drone-type air mobility vehicle and the control method thereof according to various embodiments of the present disclosure can more effectively relieve the impact caused by the collision between the lower part of a mobility vehicle and the ground during landing by allowing specific air flaps to be disposed under a body of the mobility vehicle.

Although shown and described in relation to specific embodiments of the present disclosure above, it will be apparent to those of ordinary skill in the art that the present disclosure can be variously improved and changed within the scope of the claims.

What is claimed is:

1. A drone-type air mobility vehicle comprising a body, a plurality of rotors, and a plurality of rotor arms configured to connect the plurality of rotors to the body, the drone-type air mobility vehicle comprising:
   a plurality of air flaps respectively provided in the rotor arms and configured to be deployed downwards with respect to the respective rotor arms by gas injected into the air flaps; and
   a controller configured to determine whether the rotors are abnormal, based on a yaw rate of the mobility vehicle and state information of the rotors, and the controller configured to determine whether to deploy the air flaps according to a result of the determination on whether the rotors are abnormal.

2. The drone-type air mobility vehicle of claim 1, wherein the controller is configured to determine whether to operate the air flaps, based on a steering command of the air mobility vehicle, the yaw rate of the mobility vehicle, and the state information of the rotor.

3. The drone-type air mobility vehicle of claim 2, wherein the controller is configured to deploy the air flaps in cases in which the steering command of the air mobility vehicle is 0, the yaw rate of the mobility vehicle is greater than a preconfigured reference value, and a speed of at least specific rotors among the plurality of rotors is less than a preconfigured reference value or an abnormality occurrence signal of the plurality of rotors is received from another controller.

4. The drone-type air mobility vehicle of claim 1, wherein each of the air flaps comprises an inflator configured to discharge gas under control of the controller, and a cushion configured to be deployed downwards with respect to the rotor arm by gas discharged from the inflator.

5. The drone-type air mobility vehicle of claim 4, wherein the air flap comprises a flap frame installed inside the cushion and configured to slide downwards during deployment of the cushion to be fixed at a preconfigured position, wherein a position at which the flap frame slides to be fixed is lower than a lower end of the rotor arm.

6. The drone-type air mobility vehicle of claim 5, wherein the air flap further comprises a column part fixedly arranged on each of the opposite ends of the flap frame, and a guide structure which is fixed to an upper region inside the rotor arm and into which the column part is inserted in a body tube structure.

7. The drone-type air mobility vehicle of claim 4, wherein the cushion comprises, when deployed, a first region extending downwards with respect to the rotor arm to form a vertical plane, and a second region extending from one end of the first region toward the body of the mobility vehicle to form a horizontal plane.

8. The drone-type air mobility vehicle of claim 7, wherein specific cushions among the cushions of the air flaps respectively installed in the plurality of rotor arms are configured such that, when rotation of the mobility vehicle occurs after deployment, pressure caused by the rotation of the mobility vehicle is applied to a surface from which the second region does not extend, among both surfaces of the first region, and the second region is supported by the body.

9. The drone-type air mobility vehicle of claim 7, wherein specific cushions among the cushions of the air flaps respectively installed in the plurality of rotor arms are configured such that, when rotation of the mobility vehicle occurs after deployment, pressure caused by the rotation of the mobility vehicle is applied to a surface which connects the first region and the second region, and the specific cushions are bent backwards in a rotation direction of the mobility vehicle.

10. The drone-type air mobility vehicle of claim 7, wherein the controller is configured to:
    after determining to deploy the air flaps, first deploy a cushion having the first region disposed ahead of the second region along a rotation direction of the air mobility vehicle during deployment; and
    when a rotational speed of the air mobility vehicle needs to be further decelerated, additionally deploy a cushion having the second region disposed ahead of the first region along the rotation direction during deployment.

11. A method for controlling a drone-type air mobility vehicle comprising a body, a plurality of rotors, and a plurality of rotor arms configured to connect the plurality of rotors to the body, the method comprising:
    providing a plurality of air flaps respectively provided in the rotor arms and configured to be deployed downwards with respect to the respective rotor arms by gas injected into the air flaps;
    determining, by a controller, whether to deploy the air flaps;
    when the controller determines to deploy the air flaps, primarily deploying specific air flaps among the plurality of air flaps, based on a rotation direction of the air mobility vehicle; and
    when the controller determines that a rotational speed of the air mobility vehicle needs to be further decelerated, additionally deploying the remaining air flaps.

12. The method of claim 11, wherein in the determining whether to deploy the air flaps, the controller determines to deploy the air flaps in cases in which a steering command of the air mobility vehicle is 0, the yaw rate of the mobility vehicle is greater than a preconfigured reference value, and a speed of at least specific rotors among the plurality of rotors is less than a preconfigured reference value or an abnormality occurrence signal of the plurality of rotors is received from another controller.

13. The method of claim 11, wherein the air flap comprises a cushion configured to be deployed by air injected into the cushion, wherein the cushion comprises, when deployed, a first region extending downwards with respect to the rotor arm to form a vertical plane, and a second region extending from one end of the first region toward the body of the mobility vehicle to form a horizontal plane.

14. The method of claim 13, wherein in the primarily deploying specific air flaps, the controller deploys a cushion having the first region disposed ahead of the second region along the rotation direction during deployment.

15. The method of claim 13, wherein in the additionally deploying the remaining air flaps, the controller deploys a cushion having the second region disposed ahead of the first region along the rotation direction during deployment.

* * * * *